United States Patent
Bolger et al.

(10) Patent No.: US 9,738,287 B2
(45) Date of Patent: Aug. 22, 2017

(54) PRECONDITIONING FOR VEHICLE SUBSYSTEMS

(71) Applicant: FORD GLOBAL TECHNOLOGIES, LLC, Dearborn, MI (US)

(72) Inventors: Bryan Michael Bolger, Canton, MI (US); Angel Fernando Porras, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/854,518

(22) Filed: Sep. 15, 2015

(65) Prior Publication Data
US 2017/0072966 A1   Mar. 16, 2017

(51) Int. Cl.
| | | |
|---|---|---|
| B60L 9/00 | (2006.01) | |
| B60W 50/00 | (2006.01) | |
| B60L 1/02 | (2006.01) | |
| B60W 20/00 | (2016.01) | |
| B60L 11/18 | (2006.01) | |
| F01P 7/16 | (2006.01) | |
| B60H 1/00 | (2006.01) | |
| B62D 1/06 | (2006.01) | |
| B60N 2/56 | (2006.01) | |
| F16H 57/04 | (2010.01) | |
| B60W 50/08 | (2012.01) | |

(52) U.S. Cl.
CPC ..... *B60W 50/0098* (2013.01); *B60H 1/00892* (2013.01); *B60L 1/02* (2013.01); *B60L 11/1874* (2013.01); *B60N 2/56* (2013.01); *B60W 20/00* (2013.01); *B60W 50/085* (2013.01); *B62D 1/06* (2013.01); *B62D 1/065* (2013.01); *F01P 7/16* (2013.01); *F16H 57/0413* (2013.01); *B60L 2240/34* (2013.01); *B60L 2240/445* (2013.01); *B60L 2240/545* (2013.01); *B60L 2240/80* (2013.01); *B60W 2050/0014* (2013.01); *B60W 2050/0089* (2013.01); *B60W 2550/12* (2013.01); *B60W 2710/30* (2013.01); *Y10S 903/904* (2013.01)

(58) Field of Classification Search
CPC ...... B60W 50/00; B60W 50/08; B60W 20/00; B60L 1/02; B60H 1/00
USPC ......................................... 701/22
See application file for complete search history.

(56) References Cited

U.S. PATENT DOCUMENTS

| | | |
|---|---|---|
| 7,849,944 B2 | 12/2010 | DeVault |
| 8,275,505 B2 | 9/2012 | Kumagai |
| 8,560,155 B2 | 10/2013 | Kedar-Dongarkar et al. |
| 8,914,173 B2 | 12/2014 | Biondo et al. |
| 9,002,568 B2 * | 4/2015 | Datta .................. B60R 16/02 236/46 R |
| 9,008,858 B1 | 4/2015 | Payne et al. |

(Continued)

*Primary Examiner* — Thomas G Black
*Assistant Examiner* — Luke Huynh
(74) *Attorney, Agent, or Firm* — David Kelley; Brooks Kushman P.C.

(57) ABSTRACT

A vehicle includes a subsystem conditioner and a controller. The controller is programmed to, in response to a difference between user specified and learned times of day being greater than a threshold, activate the conditioner a predetermined time before each of the times of day. The controller is also programmed to, in response to the difference being less than the threshold, activate the conditioner the predetermined time before the specified time of day but not the learned time of day.

20 Claims, 3 Drawing Sheets

(56) References Cited

U.S. PATENT DOCUMENTS

| | | | |
|---|---|---|---|
| 2004/0070270 A1* | 4/2004 | Gunji | B60K 6/52 303/152 |
| 2011/0022257 A1* | 1/2011 | Kumagai | B60H 1/00642 701/22 |
| 2013/0096734 A1* | 4/2013 | Tonegawa | B60H 1/00257 701/2 |
| 2015/0129192 A1* | 5/2015 | Boss | B60H 1/00771 165/202 |

* cited by examiner

PRECONDITIONING FOR VEHICLE SUBSYSTEMS

TECHNICAL FIELD

The present disclosure relates to preconditioning vehicle subsystems prior to an anticipated use of the vehicle.

BACKGROUND

Vehicle subsystems may be preconditioned to ensure desired comfort levels of the user or proper operating conditions of the vehicle subsystem.

SUMMARY

A vehicle includes a subsystem conditioner and a controller. The controller is programmed to, in response to a difference between user specified and learned times of day being greater than a threshold, activate the conditioner a predetermined time before each of the times of day. The controller is also programmed to, in response to the difference being less than the threshold, activate the conditioner the predetermined time before the specified time of day but not the learned time of day.

A vehicle subsystem conditioner controller is provided. The vehicle subsystem conditioner controller includes input channels configured to receive signals indicative of user specified and learned times of day, output channels configured to provide first commands to activate a subsystem conditioner a predetermined time before each of the times of day and second commands to activate the conditioner the predetermined time before the user specified time of day but not the learned time of day, and control logic configured to generate the first commands in response to a difference between the times of day being greater than a threshold and to generate the second commands in response to the difference being less than the threshold.

A vehicle climate controller is provided. The vehicle climate controller includes input channels configured to receive signals indicative of ambient and forecasted climate conditions, output channels configured to provide commands to active a climate control system a predetermined time before a scheduled time of day, and control logic configured to generate the commands to activate the climate control system to condition a vehicle cabin based on a learned offset between the ambient and forecasted climate conditions.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
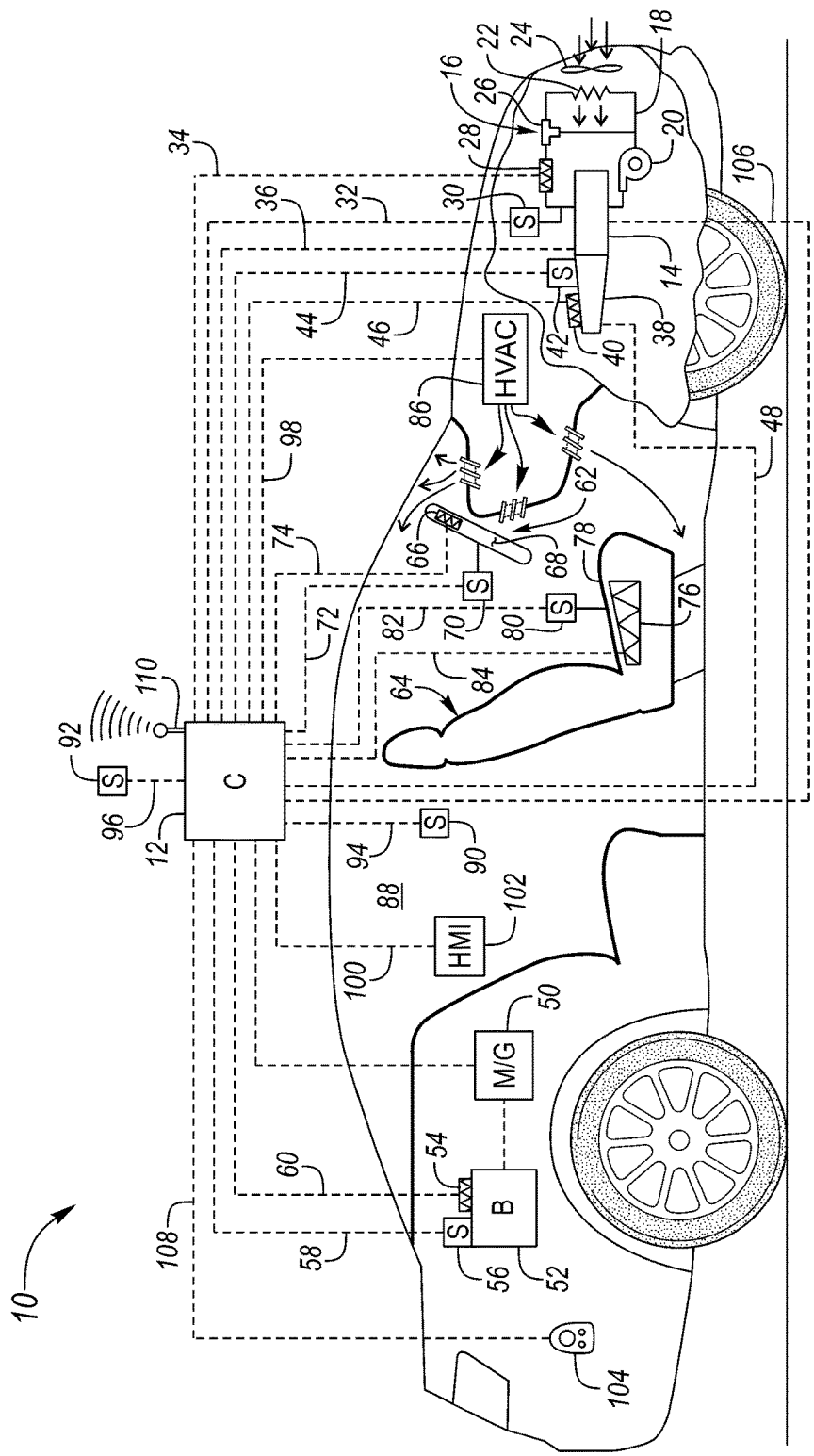
FIG. 1 is a schematic illustration of an exemplary vehicle that includes a conditioning system for the vehicle's subsystems.

Referring to FIG. 1, a vehicle 10 that includes a conditioning system for one or more of the vehicle's subsystems is illustrated. The conditioning system may be referred to as a subsystem conditioner. Each subsystem may include its own conditioner that is specific to that subsystem. Each subsystem conditioner may be in communication with a controller 12 that is configured to activate the specific subsystem conditioners when a certain set of criteria is met. The controller 12 may be referred to as a vehicle subsystem conditioner controller. The controller 12, the inputs to the controller 12, and the outputs to the controller 12, may be shown as located outside of the vehicle 10 for simplicity purposes only. It should be understood that the controller 12, the inputs to the controller 12, and the outputs to the controller 12 may be located on or within the vehicle 10.

While illustrated as one controller, the controller 12 may be part of a larger control system and may be controlled by various other controllers throughout the vehicle 10, such as a vehicle system controller (VSC). It should therefore be understood that the controller 12 and one or more other controllers can collectively be referred to as a "controller" that controls various actuators in response to signals from various sensors to control various functions of the vehicle. Controller 12 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

A first vehicle subsystem may include the engine 14 and the engine cooling system 16. The engine cooling system 16 is configured to remove excess heat from the engine 14. The engine cooling system 16 may include coolant that is cycled through a cooling loop 18 by a pump 20. The cooling loop 18 may be in communication with the engine 14 such that excess heat is transferred from the engine 14 to the coolant within the cooling loop 18. The excess heat may be rejected through a heat exchanger 22. A fan 24 may be used to direct air across the heat exchanger 22 in order to transfer heat from the coolant within the cooling loop 18 to the ambient air. The cooling loop 18 may include a thermostat 26 that is configured to bypass the heat exchanger 22 when the engine 14 is operating and the coolant within the cooling loop 18 is below an optimal or desired operating temperature range.

The cooling loop 18 may include a first subsystem conditioner 28 which may comprise a heater and/or cooler that is configured to adjust the temperature of the coolant within the cooling loop 18 such that the temperature is either adjusted to or maintained within the optimal or desired operating temperature range of the coolant. The first subsystem conditioner 28 may be a thermoelectric cooler, a thermoelectric heater, an immersion heater, a heater having resistance heating elements, a positive temperature coefficient (PTC) heater, or any other type of heater or cooler (or combination thereof) that is capable of adjusting or maintaining the temperature of the coolant within the cooling loop 18. Alternatively, the first subsystem conditioner 28 and the engine 14 may be one and the same. In the alternative embodiment, the engine 14 may be operated in order to adjust or maintain the temperature of the coolant within the cooling loop 18 such that the temperature is within the optimal or desired operating temperature range.

A first sensor 30 may be used to determine the temperature of the coolant within the cooling loop 18. The first sensor 30 may be in communication with the controller 12. An input channel 32 may communicate the temperature of the coolant within the cooling loop 18 to the controller 12. The controller 12 may include control logic and/or algorithms that are configured to activate the first subsystem conditioner 28 in order to adjust the temperature of the coolant within the cooling loop 18 based on the temperature values of the coolant received from the first sensor 30 via the input channel 32. The controller 12 may then communicate to the first subsystem conditioner 28 via an output channel 34 to activate the first subsystem conditioner 28 in order to adjust the temperature of the coolant within the cooling loop 18 such that the temperature of the coolant is within the optimal or desired operating temperature range. In the alternative embodiment, the controller 12 may communicate via output channel 36 with the engine 14 and the engine cooling system 16 to activate the engine 14 and cooling system 16 (including the pump 20) in order to adjust the temperature of the coolant within the cooling loop 18 such that the temperature of the coolant is within the optimal or desired operating temperature range.

A second vehicle subsystem may include a transmission 38. The transmission 38 may include a transmission fluid or lubricant that has an optimal operating temperature. The transmission 38 may include a series of gears, clutches, brakes, etc. The transmission 38 may also include a pump that is configured to cause the transmission fluid to flow to various components of the transmission 38 and/or maintain a desired pressure of the transmission fluid. The transmission 38 may be an automatic or manual transmission. The transmission 38 may include a torque converter.

The transmission 38 may include a second subsystem conditioner 40 which may comprise a heater and/or cooler that is configured to adjust the temperature of the transmission fluid such that the temperature is either adjusted to or maintained within the optimal or desired operating temperature range of the transmission fluid. The second subsystem conditioner 40 may be a thermoelectric cooler, a thermoelectric heater, an immersion heater, a heater having resistance heating elements, a positive temperature coefficient (PTC) heater, or any other type of heater or cooler (or combination thereof) that is capable of adjusting or maintaining the temperature of the transmission fluid. Alternatively, the second subsystem conditioner 40 and the transmission may be one and the same. In the alternative embodiment, the transmission 38 may be operated in order to adjust or maintain the temperature of transmission fluid such that the temperature is within the optimal or desired operating temperature range.

A second sensor 42 may be used to determine the temperature of the transmission fluid. The second sensor 42 may be in communication with the controller 12. An input channel 44 may communicate the temperature of the transmission fluid to the controller 12. The controller 12 may include control logic and/or algorithms that are configured to activate the second subsystem conditioner 40 in order to adjust the temperature of the transmission fluid based on the temperature values of the transmission fluid received from the second sensor 42 via the input channel 44. The controller 12 may then communicate to the second subsystem conditioner 40 via an output channel 46 to activate the second subsystem conditioner 40 in order to adjust the temperature of the transmission fluid such that the temperature of the transmission fluid is within the optimal or desired operating temperature range. In the alternative embodiment, the controller 12 may communicate via output channel 48 with the transmission 38 to activate the transmission (including the transmission pump) in order to adjust the temperature of the transmission fluid such that the temperature of the transmission fluid is within the optimal or desired operating temperature range.

If the vehicle 10 is a hybrid vehicle, a third vehicle subsystem that has an electric machine 50 and a traction battery 52 may be included. The electric machine may be a motor, generator, or a combination motor generator. The battery 52 may be configured to deliver power to the electric machine 50 when the electric machine is operating as a motor. The battery 52 may further be configured to receive power from the electric machine 50 when the electric machine 50 is operating as a generator. The battery 52 may have an optimal operating temperature.

The battery 52 may include a third subsystem conditioner 54 which may comprise a heater and/or cooler that is configured to adjust the temperature of the battery 52 such that the temperature is either adjusted to or maintained within the optimal or desired operating temperature range of the battery 52. The third subsystem conditioner 54 may be a thermoelectric cooler, a thermoelectric heater, a heater having resistance heating elements, a positive temperature coefficient (PTC) heater, or any other type of heater or cooler (or combination thereof) that is capable of adjusting or maintaining the temperature of the battery 52. For example, the heater or cooler may include a cooling loop that cycles a coolant through the battery 52 in order to either heat or cool the battery 52 or a refrigerant loop that absorbs heat from the battery 52.

A third sensor 56 may be used to determine the temperature of the battery 52. The third sensor 56 may be in communication with the controller 12. An input channel 58 may communicate the temperature of the battery 52 to the controller 12. The controller 12 may include control logic and/or algorithms that are configured to activate the third subsystem conditioner 54 in order to adjust the temperature of the battery 52 based on the temperature values of the battery 52 received from the third sensor 56 via the input channel 58. The controller12 may then communicate to the third subsystem conditioner 54 via an output channel 60 to activate the third subsystem conditioner 54 in order to adjust the temperature of the battery 52 such that the temperature of the battery 52 is within the optimal or desired operating temperature range.

A fourth vehicle subsystem may include various touch or contact points in the vehicle 10 where a vehicle user comes into physical contact with the vehicle 10. The contact points may include the steering wheel, seats, gear shifters, pedals, door handles, control panels, or any other component of the vehicle 10 that the vehicle user may come into physical contact with. The surface temperatures of the various contact points may be adjusted such that they are within a desired comfort range. For exemplary purposes only, the contact points will be discussed with reference to a steering wheel 62 and vehicle seat 64. However, the disclosure should be construed such that the descriptions of the contact points with respect to the steering wheel 62 and vehicle seat 64 may be applied to other contact points within the vehicle.

The steering wheel 62 may include a fourth subsystem conditioner 66 which may comprise a heater and/or cooler that is configured to adjust the temperature of the steering wheel 62 such that the temperature of an outer surface 68 of the steering wheel 62 is either adjusted to or maintained within an desired operating temperature range of the steering wheel 62. The fourth subsystem conditioner 66 may be a thermoelectric cooler, a thermoelectric heater, a heater having resistance heating elements, a positive temperature coefficient (PTC) heater, or any other type of heater or cooler (or combination thereof) that is capable of adjusting or maintaining the temperature of the steering wheel 62. For example, the heater or cooler may include a cooling loop that cycles a coolant through steering wheel 62 in order to either heat or cool the steering wheel 62 or a refrigerant loop that absorbs heat from the steering wheel 62.

A fourth sensor 70 may be used to determine the outer surface temperature of the steering wheel 62. The fourth sensor 70 may be in communication with the controller 12. An input channel 72 may communicate the outer surface temperature of the steering wheel 62 to the controller 12. The controller 12 may include control logic and/or algorithms that are configured to activate the fourth subsystem conditioner 66 in order to adjust the temperature of the steering wheel 62 based on the temperature values of the steering wheel 62 received from the fourth sensor 70 via the input channel 72. The controller 12 may then communicate to the fourth subsystem conditioner 66 via an output channel 74 to activate the fourth subsystem conditioner 66 in order to adjust the outer surface temperature of the steering wheel 62 such that the outer surface temperature of the steering wheel 62 is within the desired operating temperature range.

The vehicle seat 64 may include a fifth subsystem conditioner 76 which may comprise a heater and/or cooler that is configured to adjust the temperature of the vehicle seat 64 such that the temperature of an outer surface 78 of the vehicle seat 64 is either adjusted to or maintained within an desired operating temperature range of the vehicle seat 64. The fifth subsystem conditioner 76 is shown as located within the seat bottom. However, the fifth subsystem conditioner 76 may be located in either the seat bottom or the seatback. The fifth subsystem conditioner 76 may be a thermoelectric cooler, a thermoelectric heater, a heater having resistance heating elements, a positive temperature coefficient (PTC) heater, or any other type of heater or cooler (or combination thereof) that is capable of adjusting or maintaining the temperature of the vehicle seat 64. For example, the heater or cooler may include a cooling loop that cycles a coolant through vehicle seat 64 in order to either heat or cool the vehicle seat 64 or a refrigerant loop that absorbs heat from the vehicle seat 64.

A fifth sensor 80 may be used to determine the outer surface temperature of the vehicle seat 64. The fifth sensor 80 may be in communication with the controller 12. An input channel 82 may communicate the outer surface temperature of the vehicle seat 64 to the controller 12. The controller 12 may include control logic and/or algorithms that are configured to activate the fifth subsystem conditioner 76 in order to adjust the temperature of the vehicle seat 64 based on the temperature values of the vehicle seat 64 received from the fifth sensor 80 via the input channel 82. The controller 12 may then communicate to the fifth subsystem conditioner 76 via an output channel 84 to activate the fifth subsystem conditioner 76 in order to adjust the outer surface temperature of the vehicle seat 64 such that the outer surface temperature of the vehicle seat 64 is within the desired operating temperature range.

A fifth vehicle subsystem may include an HVAC system 86 that is configured to either heat or cool an interior cabin 88 of the vehicle 10. The HVAC system 86 may also be referred to as a subsystem conditioner.

The HVAC system 86 may include a heater and/or cooler that is configured to adjust the climate or temperature of the air in the cabin 88 such that the temperature is either adjusted to or maintained within a desired temperature range or desire comfort setting. The HVAC system 86 may include a thermoelectric cooler, a thermoelectric heater, a heater having resistance heating elements, a positive temperature coefficient (PTC) heater, or any other type of heater or cooler (or combination thereof) that is capable of adjusting or maintaining the temperature of the cabin. For example, a heater portion of the HVAC system 86 may include a fan that blows air across a heater core that is connected to the cooling loop 18 of the engine cooling system 16 in order to deliver heated air into the cabin 88. In another example, a cooling portion of the HVAC system may include an air conditioning system that comprises a refrigerant loop having an evaporator that is configured to cool the air entering the cabin 88, a compressor that is configured to cycle a refrigerant through the refrigerant loop, a condenser that is configured to reject heat from the refrigerant to the ambient surroundings, a receiver/dryer, and a thermal expansion valve.

A sixth sensor 90 may be used to determine the temperature of the cabin 88 while a seventh sensor 92 may be used to determine the temperature of the ambient surroundings. The sixth sensor 90 may be in communication with the controller 12. An input channel 94 may communicate the temperature of the cabin 88 to the controller 12. The seventh sensor 92 may be in communication with the controller 12. An input channel 96 may communicate the temperature of the ambient surroundings to the controller 12. The controller 12 may include control logic and/or algorithms that are configured to activate the HVAC system 86 in order to maintain or adjust the temperature of the cabin 88 based on the temperature value of the cabin 88 received from the sixth sensor 90 via the input channel 94 and temperature value of the ambient surroundings received from the seventh sensor 92 via the input channel 96. The controller 12 may then communicate to the HVAC system 86 via an output channel 98 to activate the HVAC system 86 in order to adjust the temperature of the cabin 88 such that the temperature of the cabin 88 is within the desired operating temperature range. In the context of the HVAC system 86 the controller 12 may be referred to as a vehicle climate controller.

The controller 12 may also be configured to receive signals indicative of expected times of day that the vehicle 10 may be operated. Expected times of day that the vehicle 10 may be operated may correspond to user specified or manually scheduled times a day that may be communicated to the controller 12 via an input channel 100 from a human machine interface 102. The user specified times of day may correspond to a time of day on a specific day of the week that the user has scheduled to use the vehicle 10.

Alternatively, expected times of day that the vehicle may be operated may correspond to learned times of day from stored data based on previous usage times of the vehicle 10. The controller 12 may calculate the learned times a day by control logic and/or algorithms included within the controller 12. The learned times of day may correspond to a time of day on a specific day of the week based on the frequency or historical use of the vehicle 10 relative to that time of day. The learned times of day may further correspond to a time of day on a specific day of the week that the engine 14 is manually started with the key or pushbutton, a plug is removed from a charging outlet 104 in a plug-in hybrid vehicle, a key fob is used to wirelessly start the engine 14, or any other action that is indicative of vehicle use.

The learned times may be recorded within a memory of the controller when signals are received by the controller 12 from input channels indicating that the engine 14 has been started, the plug is removed from the charging outlet 104 in a plug-in hybrid vehicle, or any other action that is indicative of vehicle use. For example, an output channel of the engine 14 may also act as input channel 106 to the controller 12. The input channel 108 may be configured to inform the controller 12 that the engine has been started. An output channel of the charging outlet 104 may also act as an input channel 108 to the controller 12. The input channel 106 may be configured to inform the controller 12 that the plug has been removed from the charging outlet 104 in a plug in hybrid vehicle. The controller 12 may also include a receiver 110. The receiver 110 may act as an input channel to the controller 12 from the key fob.

The controller 12 may be programmed to activate any of the specific subsystem conditioners listed above (including the HVAC system) through commands sent from the controller 12 to the subsystem conditioners via the output channels from the controller 12 specific to each subsystem conditioner. The commands may activate the subsystem conditioners such that the vehicle subsystems are conditioned to the optimal or desired operating ranges, at a predetermined time before either a user specified time of day or a learned time of day that the vehicle 10 is expected to be operated. The controller 12 may be programmed to activate the subsystem conditioners in response to both the user specified time of day and the learned time of day if the difference between the user specified time of day and the learned time of day is greater than a threshold. However, if the difference between user specified time of day and the learned time of day is less than the threshold, the controller 12 may be programmed to activate the subsystem conditioners in response to the specified time of day but not the learned time of day. The controller 12 may include control logic and/or algorithms that are configured to generate the commands to activate the subsystem conditioners based on the specified and learned times of day.

In the context of the HVAC system 86, the controller 12 may be configured to receive signals indicative of ambient and forecasted climate conditions. The ambient climate conditions may be received via the input channel 96 from the seventh sensor 92 that is configured to determine the climate and temperature of the ambient surroundings. The forecasted climate conditions may be received via the receiver 110 acting as an input channel. The forecasted climate conditions may be received over wireless communication, such as radio, Wi-Fi, satellite, Bluetooth, near field communication, or any other type of wireless communication known in the art. The forecasted climate conditions may consist of broadcasted media sources. The controller 12 may then generate a command to activate the HVAC system 86. The command may be sent to the HVAC system 86 via the output channel 98 to activate the HVAC system 86 a predetermined time before a scheduled time of day such that the temperature of the cabin 88 is within the desired operating temperature range when the vehicle user enters the vehicle cabin 88. The scheduled time a day may correspond to a user specified time a day or a learned time of day as described above.

The controller 12 may include control logic and/or algorithms that are configured to generate the commands to activate the HVAC system 86 to condition the vehicle cabin 88 based on a learned offset between the ambient and forecasted climate conditions. For example, if there is a scheduled time of day on a specific day of the week that the vehicle 10 is to operated and there has been a historical offset between the ambient and forecasted climate conditions, the controller 12 will generate command to activate the HVAC system 86 based on the difference between the ambient and forecasted climate conditions, which may entail conditioning the vehicle based on the ambient climate condition plus or minus the historical offset value. The controller 12 may further include control logic and/or algorithms that are configured to generate the commands to activate the HVAC system 86 to condition the cabin 88 to a climate preference based on a specific user's scheduled time of day when there are multiple users of the vehicle 10. For example, the vehicle 10 may be able to distinguish between users based on data collected when the user is seated within the vehicle (e.g., seat position, steering wheel position, mirror positions, climate control settings, entertainment settings, etc.). In the alternative, the vehicle 10 may be able to distinguish between users based on specific users using individual key fobs to start the engine 14 of the vehicle 10 on specific days of the week.

Figure 2:
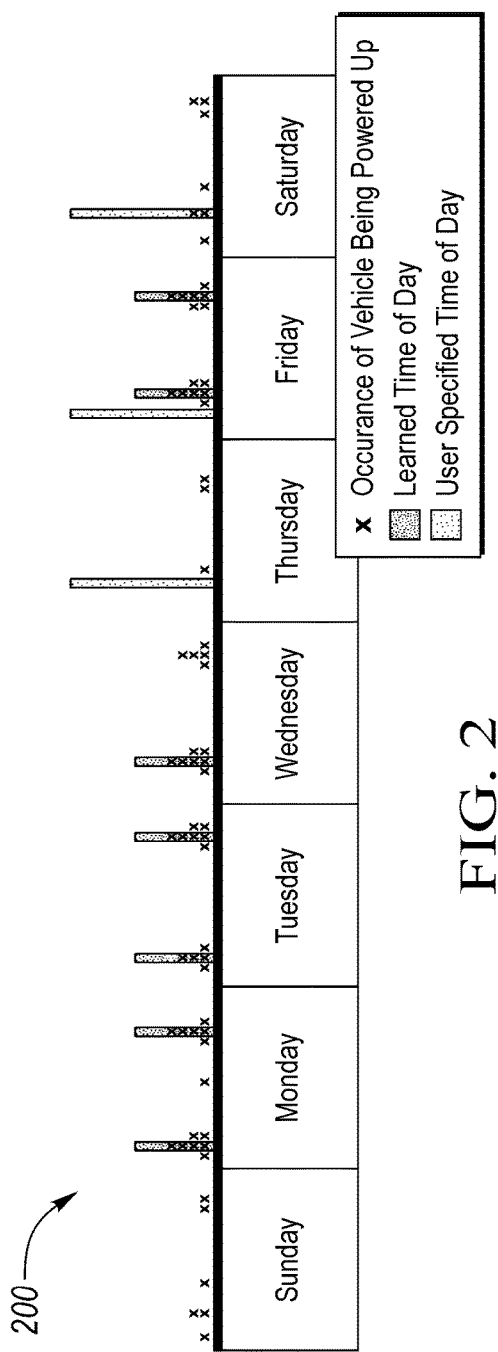
FIG. 2 is an exemplary histogram illustrating times of day that the conditioning system may be activated.

FIG. 2 is an exemplary histogram 200 illustrating times of day that the conditioning system (or subsystem conditioners listed above) may be activated. The histogram 200 may collect data points indicative of each occurrence that the vehicle is powered up. The histogram 200 may be a rolling histogram that collects a limited number of data points, so that if a vehicle user changes their schedule the updated data points will replace the existing data points that are no longer relevant. The collected data points may be used to generate learned times of day that the vehicle 10 is likely to be used. Again, the learned time today may correspond to a specific time of day on a specific day of the week. A minimum number of data points may need to be collected before a learned usage time is scheduled. The learned usage time may correspond to the average time of a set of data points that are clustered within a certain time range. The histogram 200 may also include the user specified times of day. Again, if the user specified time of day is within a threshold of a learned time of day then the subsystem conditioners may be activated on the user specified time of day but not the learned time of day. An example of where the subsystem conditioners may be activated on the user specified time of day but not the learned time of day is shown on Friday in the histogram 200 where the user specified time of day in the learned time of day are shown to be within a threshold. The threshold may correspond to anywhere from zero to four hours.

Figure 3:
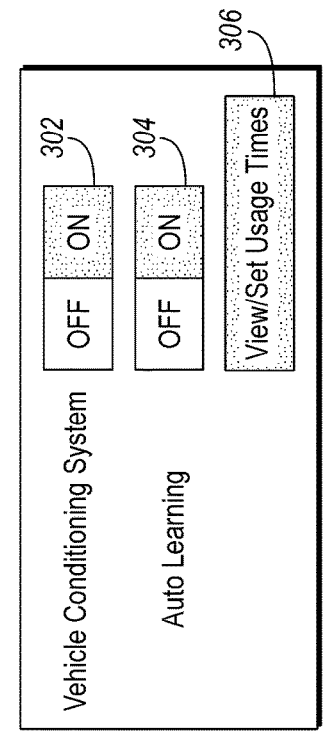
FIG. 3 is an illustration of a first set of user interface controls for the vehicle conditioning system.

FIG. 3 is an illustration of a first set of user interface controls 300 for the vehicle conditioning system (or subsystem conditioners listed above). The first set of user interface controls 300 may be included and accessible through the human machine interface 102. The first set of user interface controls 300 includes an on/off switch 302 for the conditioning system, and an on/off switch 304 for the auto learning system that collects the usage times of the vehicle 10 and determines the learned times of day that the vehicle 10 is to be operated. The first set of user interface controls 300 may also include a view/set usage times button 306. When the view/set usage times button 306 is pressed, a display screen on the human machine interface 102 may transition to a second set of user interface controls.

Figure 4:
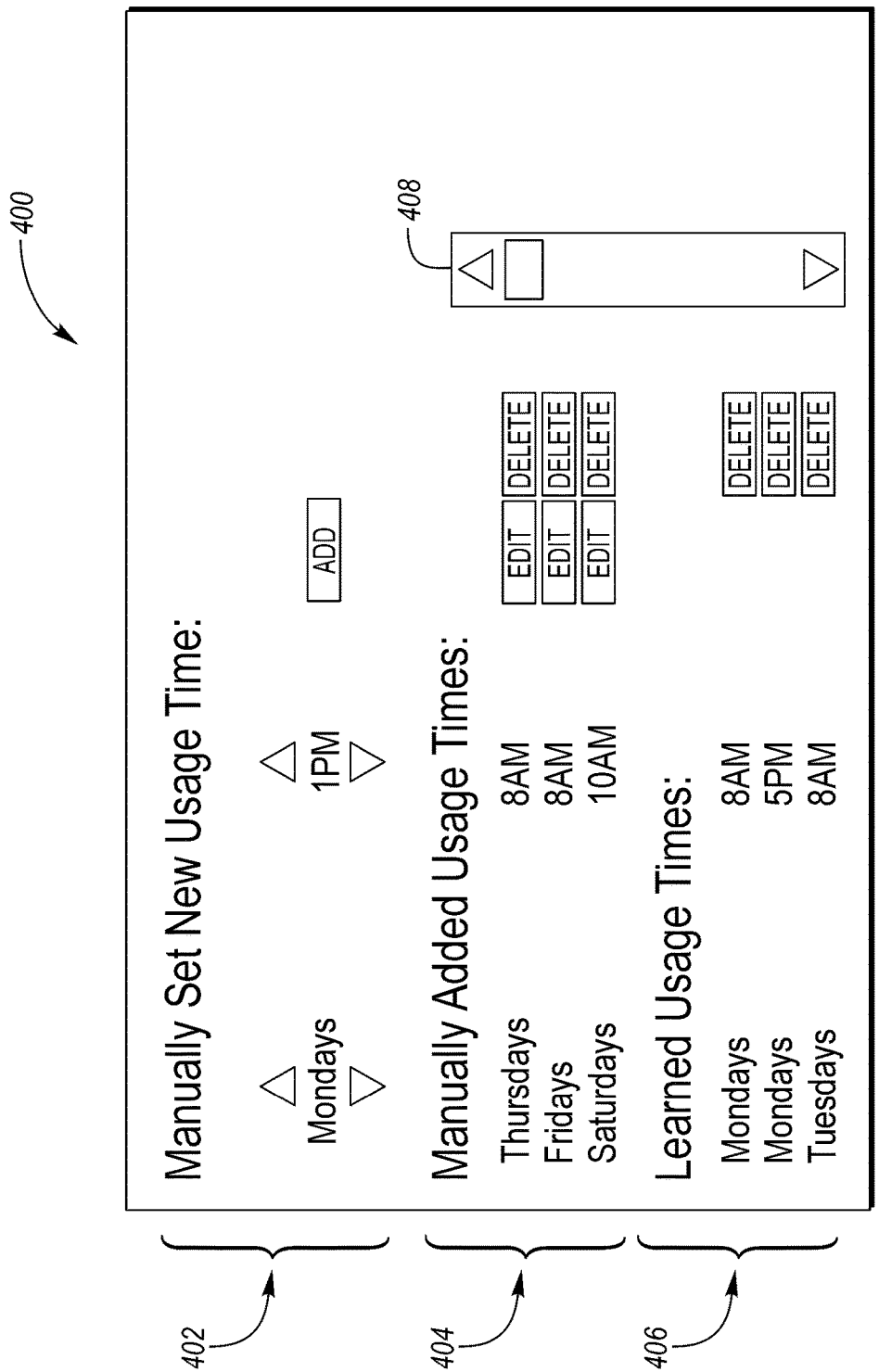
FIG. 4 is an illustration of a second set of user interface controls for the vehicle conditioning system.

FIG. 4 is an illustration of the second set of user interface controls 400 for the vehicle conditioning system (or subsystem conditioners listed above). The second set of user interface controls 400 may include a first set of control buttons 402 that allows a user to add user specified times of day that the vehicle 10 is to be operated. The first set of control buttons 402 may include selections for the day of the week and the time of day. A second set of control buttons 404 may be included that allows a user to either edit or delete the user specified times of day that the vehicle 10 is to be operated. Adjacent to the second set of control buttons 404 may be a display indicating the currently existing user specified times of day. A third set of control buttons 406 may be included that allows a user to delete the learned times of day that the vehicle 10 is to be operated. Adjacent to the third set of control buttons 406 may be a display indicating the currently existing learned times of day. The second set of user interface controls 400 may also include a scroll 408 that allows a user to scroll between the user specified times of day and learned times of day.

It should be understood that the hybrid vehicle configuration in FIG. 1 is merely exemplary and is not intended to be limited. Other hybrid and electric vehicle configurations should be construed as disclosed herein including series hybrid vehicles, parallel hybrid vehicles, series-parallel hybrid vehicles, power-split hybrid vehicles, plug-in hybrid electric vehicles (PHEVs), fuel cell hybrid vehicles, battery operated electric vehicles (BEVs), or any other hybrid or electric vehicle configuration known to a person of ordinary skill in the art. It should also be understood that the vehicle may be a non-hybrid vehicle.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   a subsystem conditioner; and
   a controller programmed to,
      in response to a difference between user specified and learned times of day being greater than a threshold, activate the conditioner a predetermined time before each of the times of day, and
      in response to the difference being less than the threshold, activate the conditioner the predetermined time before the specified time of day but not the learned time of day.

2. The vehicle of claim 1, wherein the learned time of day corresponds to a time of day on a specific day of the week that the user is expected operate the vehicle based on historical use of the vehicle.

3. The vehicle of claim 2, wherein the user specified time of day corresponds to a time of day on a specific day of the week that the user has manually scheduled to operate the vehicle.

4. The vehicle of claim 1 further comprising an engine cooling system, wherein the subsystem conditioner is configured to adjust a temperature of a coolant within the engine cooling system such that the temperature is within a desired operating range.

5. The vehicle of claim 1 further comprising a traction battery, wherein the subsystem conditioner is configured to adjust a temperature of the traction battery such that the temperature is within a desired operating range.

6. The vehicle of claim 1, wherein the subsystem conditioner is a climate control system configured to adjust a climate of a vehicle cabin such that the climate of the vehicle cabin is adjusted to a desired comfort setting.

7. The vehicle of claim 1 further comprising contact points located in an interior of the vehicle that are configured to come into contact with a vehicle user, wherein the subsystem conditioner is configured to adjust a surface temperature of the contact points such that temperatures are within a desired comfort setting.

8. The vehicle of claim 7, wherein the contact points are outer surfaces of a steering wheel.

9. The vehicle of claim 7, wherein the contact points are outer surfaces of a vehicle seat.

10. A vehicle subsystem conditioner controller comprising:
    input channels configured to receive signals indicative of user specified and learned times of day;
    output channels configured to provide first commands to activate a subsystem conditioner a predetermined time before each of the times of day and second commands to activate the conditioner the predetermined time before the user specified time of day but not the learned time of day; and
    control logic configured to generate the first commands in response to a difference between the times of day being greater than a threshold and to generate the second commands in response to the difference being less than the threshold.

11. The controller of claim 10, wherein the learned time of day corresponds to a time of day on a specific day of the week that the user is expected to operate the vehicle based on historical use of the vehicle.

12. The controller of claim 11, wherein the user specified time of day corresponds to a time of day on a specific day of the week that the user has manually scheduled to operate the vehicle.

13. The controller of claim 10, wherein the subsystem conditioner is configured to adjust a temperature of a coolant within an engine cooling system such that the temperature is within a desired operating range.

14. The controller of claim 10, wherein the subsystem conditioner is configured to adjust a temperature of a fluid within a transmission such that the temperature is within a desired operating range.

15. The controller of claim 10, wherein the subsystem conditioner is configured to adjust a temperature of a traction battery such that the temperature is within a desired operating range.

16. The controller of claim 10, wherein the subsystem conditioner is configured to adjust a temperature of an outer surface of a vehicle seat such that the temperature is within a desired comfort setting.

17. The controller of claim 10, wherein the subsystem conditioner is configured to adjust a temperature of an outer surface of a steering wheel such that the temperature is within a desired comfort setting.

18. The controller of claim 10, wherein the subsystem conditioner is a climate control system configured to adjust a climate of a vehicle cabin such that the climate of the vehicle cabin is adjusted to a user's desired comfort setting.

19. A vehicle climate controller comprising:
input channels configured to receive signals indicative of ambient and forecasted climate conditions;
output channels configured to provide commands to activate a climate control system a predetermined time before a scheduled time of day; and
control logic configured to generate the commands to activate the climate control system to condition a vehicle cabin based on a learned offset between the ambient and forecasted climate conditions.

20. The vehicle climate controller of claim 19, wherein the control logic is further configured to generate the commands to activate the climate control system to condition the vehicle cabin to a climate preference of one of a plurality of users based on a specific user's scheduled time of day.

* * * * *